US011309757B2

(12) United States Patent
Ohzu (10) Patent No.: US 11,309,757 B2
(45) Date of Patent: Apr. 19, 2022

(54) ROTOR OF ROTATING ELECTRICAL MACHINE

(71) Applicant: HONDA MOTOR CO., LTD., Tokyo (JP)

(72) Inventor: Tatsuya Ohzu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 104 days.

(21) Appl. No.: 16/728,889

(22) Filed: Dec. 27, 2019

(65) Prior Publication Data

US 2020/0212744 A1 Jul. 2, 2020

(30) Foreign Application Priority Data

Dec. 27, 2018 (JP) .............................. JP2018-245641

(51) Int. Cl.
*H02K 1/32* (2006.01)
*H02K 1/27* (2022.01)
(Continued)

(52) U.S. Cl.
CPC ............... *H02K 1/32* (2013.01); *H02K 1/276* (2013.01); *H02K 9/19* (2013.01)

(58) Field of Classification Search
CPC ............ H02K 1/276; H02K 1/32; H02K 9/19; H02K 1/2766
(Continued)

(56) References Cited

U.S. PATENT DOCUMENTS

2007/0052313 A1* 3/2007 Takahashi ............... H02K 1/32
310/156.53
2007/0126304 A1 6/2007 Ito et al.
(Continued)

FOREIGN PATENT DOCUMENTS

CN 1612440 A 5/2005
CN 1976171 A 6/2007
(Continued)

OTHER PUBLICATIONS

Nov. 2, 2021, Chinese Office Action issued for related CN Application No. 201911333581.X.

*Primary Examiner* — Alex W Mok
(74) *Attorney, Agent, or Firm* — Paratus Law Group, PLLC (57) ABSTRACT

A rotor of a rotating electrical machine includes: a rotor core with a plurality of magnet insertion holes; and a plurality of magnetic pole portions including permanent magnets inserted into the plurality of magnet insertion holes. A space portion is provided between a space portion forming surface of at least one of the outer diameter surface and the inner diameter surface of the permanent magnet and a wall surface of the magnet insertion hole facing the space portion forming surface. The space portion includes: a liquid medium storage region provided in a center in the circumferential direction, and liquid medium throttle regions provided at both end portions in the circumferential direction, and a distance between the permanent magnet and the magnet insertion hole in the liquid medium throttle region is shorter than a distance between the permanent magnet and the magnet insertion hole in the liquid medium storage region.

8 Claims, 4 Drawing Sheets

(51) Int. Cl.
*H02K 9/19* (2006.01)
*H02K 1/276* (2022.01)

(58) Field of Classification Search
USPC .......................................................... 310/54
See application file for complete search history.

(56) References Cited

U.S. PATENT DOCUMENTS

| | | | | |
|---|---|---|---|---|
| 2012/0139378 | A1* | 6/2012 | Endo | H02K 1/28 310/156.21 |
| 2013/0334910 | A1* | 12/2013 | Takahashi | H02K 15/03 310/52 |
| 2015/0137646 | A1* | 5/2015 | Tsuchida | H02K 1/28 310/156.09 |
| 2015/0162789 | A1* | 6/2015 | Tanaka | H02K 1/276 310/156.21 |
| 2016/0301269 | A1* | 10/2016 | Yamaguchi | H02K 1/2766 |
| 2017/0110944 | A1* | 4/2017 | Nigo | H02K 1/02 |
| 2017/0294814 | A1* | 10/2017 | Baba | F25B 31/026 |
| 2018/0041080 | A1* | 2/2018 | Nakano | H02K 15/02 |

FOREIGN PATENT DOCUMENTS

| | | |
|---|---|---|
| CN | 204886469 U | 12/2015 |
| JP | 2002-345188 A | 11/2002 |
| JP | 2004-289905 A | 10/2004 |
| JP | 2013-132115 A | 7/2013 |
| JP | 2014-166083 A | 9/2014 |
| JP | 2014-183602 A | 9/2014 |
| JP | 2017-163735 A | 9/2017 |

* cited by examiner

ROTOR OF ROTATING ELECTRICAL MACHINE

CROSS-REFERENCE TO RELATED APPLICATIONS

This application is based on and claims priority under 35 USC 119 from Japanese Patent Application No. 2018-245641 filed on Dec. 27, 2018.

TECHNICAL FIELD

The present invention relates to a rotor of a rotating electrical machine.

BACKGROUND ART

In recent years, a so-called IPM motor using, as a rotor of a rotating electrical machine, a rotor in which a plurality of permanent magnets are arranged at predetermined intervals in a circumferential direction inside a rotor core is known. In such an IPM motor, as means for fixing the permanent magnet to the rotor core, for example, like a rotor of a rotating electrical machine described in JP-A-2017-163735, a so-called resin injection method is known in which a permanent magnet is inserted into a magnet insertion hole of the rotor, then resin is injected into the magnet insertion hole and the permanent magnet is fixed by solidifying the resin.

However, like the rotor of the rotating electrical machine described in JP-A-2017-163735, when fixing the permanent magnet to the rotor core by the resin injection method, the cost is increased because the resin is used. There is a problem that the manufacturing time becomes long because a process of injecting the resin into the magnet insertion hole and a process of solidifying the resin are included in manufacturing the rotor.

On the other hand, when the resin is not injected into the magnet insertion hole, the permanent magnet can move within the magnet insertion hole due to a gap generated between the permanent magnet and the magnet insertion hole. Therefore, when the rotation speed of the rotor increases, the permanent magnet moves radially outward due to centrifugal force and collides with the magnet insertion hole. When the rotation speed of the rotor is reduced, the permanent magnet moves inward in the radial direction where the amount of iron in the rotor core is large due to the magnetic force and collides with the magnet insertion hole. Therefore, when the permanent magnet collides with the magnet insertion hole, there is a problem that noise is generated by the impact sound of the collision.

SUMMARY OF INVENTION

An aspect of the invention provides a rotor of a rotating electrical machine capable of reducing noise generated when a permanent magnet collides with a magnet insertion hole by changing the rotation speed of the rotor.

An embodiment of the present invention relates to a rotor of a rotating electrical machine which includes:
a substantially annular rotor core with a plurality of magnet insertion holes formed along a circumferential direction; and
a plurality of magnetic pole portions including permanent magnets inserted into the plurality of magnet insertion holes, wherein
a liquid medium flows or is accommodated in the magnet insertion hole,
the permanent magnet is inserted into the magnet insertion hole to be movable in a radial direction,
a space portion is provided between a space portion forming surface of at least one of the outer diameter surface and the inner diameter surface of the permanent magnet and a wall surface of the magnet insertion hole facing the space portion forming surface,
the space portion includes:
a liquid medium storage region which is provided in a center in the circumferential direction and stores the liquid medium, and
liquid medium throttle regions provided at both end portions in the circumferential direction, and
a distance between the permanent magnet and the magnet insertion hole in the liquid medium throttle region is shorter than a distance between the permanent magnet and the magnet insertion hole in the liquid medium storage region.

According to the above embodiment of the invention, when the permanent magnet moves in the radial direction due to a change in the rotation speed of the rotor and the space portion becomes smaller, the liquid medium stored in the liquid medium storage region of the space portion functions as a damper. As a result, it is possible to reduce noise generated when the permanent magnet collides with the magnet insertion hole due to a change in the rotation speed of the rotor.

DESCRIPTION OF EMBODIMENTS

Hereinafter, an embodiment of a rotor of a rotating electrical machine according to the invention will be described with reference to the accompanying drawings.

<Overall Configuration of Rotor>

Figure 1:
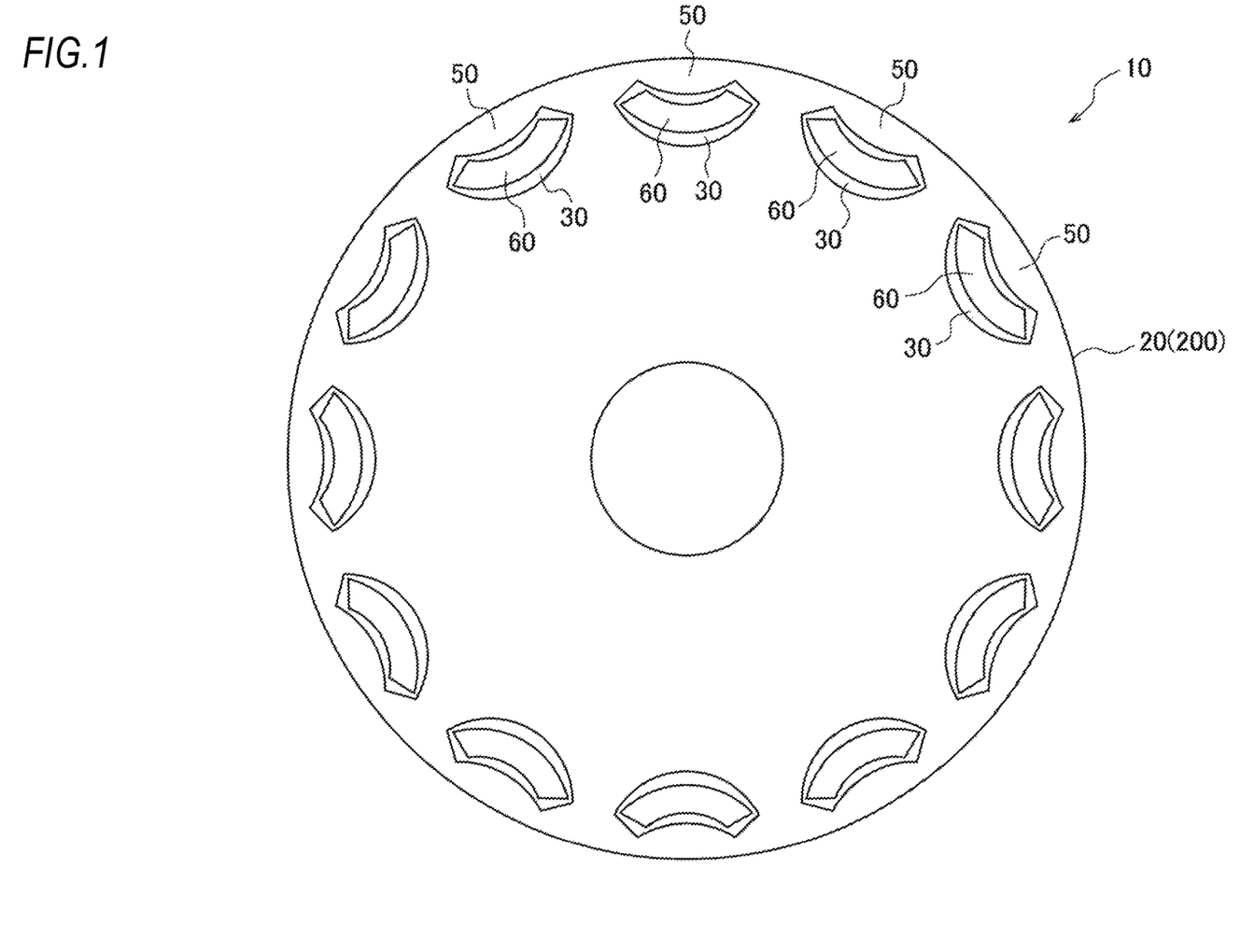
FIG. 1 is a front view of a rotor of a rotating electrical machine according to an embodiment of the invention.

As illustrated in FIG. 1, a rotor 10 of a rotating electrical machine of a first embodiment includes a rotor core 20 attached to an outer peripheral portion of a rotor shaft (not illustrated) and a plurality of magnetic pole portions 50 formed in the rotor core 20 at predetermined intervals in a circumferential direction. The rotor 10 has a substantially annular shape and is disposed on the inner peripheral side of a stator (not illustrated).

The rotor core 20 is formed by laminating a plurality of annular electromagnetic steel plates having substantially the same shape, for example, silicon steel plates 200, in the axial direction, and a plurality of magnet insertion holes 30 are formed at predetermined intervals in the circumferential direction.

The magnetic pole portion 50 is constituted by a permanent magnet 60 inserted into each magnet insertion hole 30. The permanent magnets 60 are magnetized in a radial direction and are arranged so that the magnetization directions of the magnetic pole portions 50 are alternately reversed in the circumferential direction.

<Configuration of Magnetic Pole Portion>

Figure 2:
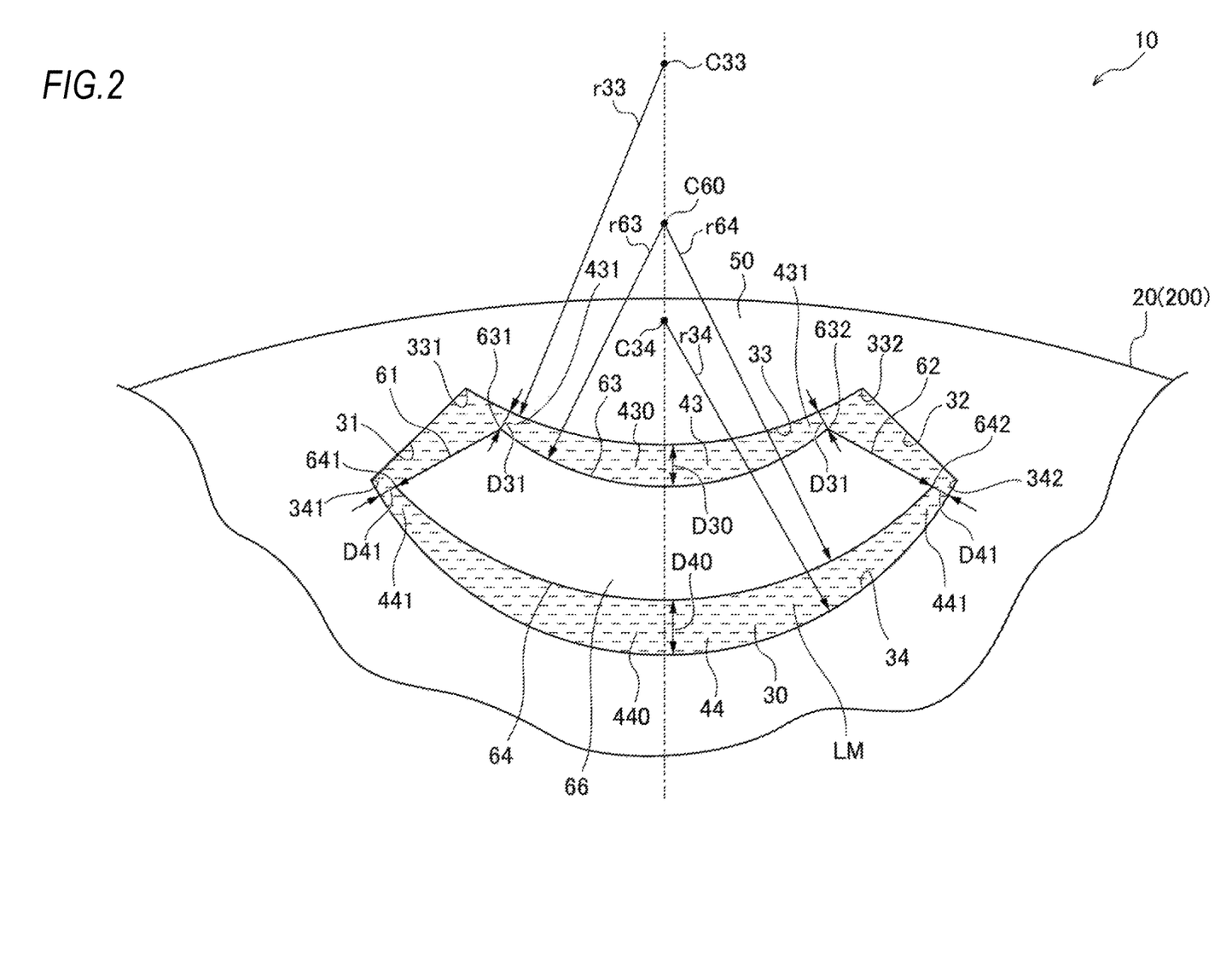
FIG. 2 is an enlarged view around a magnetic pole portion of the rotor of the rotating electrical machine of FIG. 1.

As illustrated in FIG. 2, the permanent magnet 60 has a circular arc shape curved inward in a radial direction of the rotor core 20. The permanent magnet 60 includes an outer diameter side first end portion 631 and an outer diameter side second end portion 632 which form both end portions in a circumferential direction of the outer diameter side of the rotor core 20, and an inner diameter side first end portion 641 and an inner diameter side second end portion 642 which form both end portions in the circumferential direction of the inner diameter side of the rotor core 20. The permanent magnet 60 includes a first end surface 61 extending from the outer diameter side first end 631 to the inner diameter side first end 641, a second end surface 62 extending from the outer diameter side second end 632 to the inner diameter side second end 642, an outer diameter surface 63 extending from the outer diameter side first end portion 631 to the outer diameter side second end portion 632 and having a circular arc shape convex radially inward, and an inner diameter surface 64 extending from the inner diameter side first end portion 641 to the inner diameter side second end portion 642 and having a circular arc shape convex radially inward. In the embodiment, the outer diameter surface 63 and the inner diameter surface 64 respectively have an arc radius r63 and an arc radius r64 and are concentric arcs with the same arc center C60. Therefore, the permanent magnet 60 is an arc magnet having a substantially uniform thickness in a circumferential direction.

The permanent magnet 60 is inserted into the magnet insertion hole 30 formed in the rotor core 20 to be movable in the radial direction of the rotor core 20.

The magnet insertion hole 30 includes an outer diameter side first end portion 331 and an outer diameter side second end portion 332 which form both end portions in the circumferential direction on the outer diameter side of the rotor core 20 and an inner diameter side first end portion 341 and an inner diameter side second end portion 342 which form both end portions in the circumferential direction on the inner diameter side of the rotor core 20. The permanent magnet 60 includes a first end wall surface 31 extending from the outer diameter side first end portion 331 to the inner diameter side first end portion 341, a second end wall surface 32 extending from the outer diameter side second end portion 332 to the inner diameter side second end portion 342, an outer diameter wall surface 33 extending from the outer diameter side first end portion 331 to the outer diameter side second end portion 332 and having a circular arc shape convex radially inward, and an inner diameter wall surface 34 extending from the inner diameter side first end portion 341 to the inner diameter side second end portion 342 and having a circular arc shape convex radially inward.

The magnet insertion hole 30 is filled with a liquid medium LM. The liquid medium LM is a refrigerant which cools the rotor 10, communicates with a refrigerant supply path (not illustrated) provided in the rotor shaft (not illustrated), and flows through the magnet insertion hole 30 in an axial direction. Thereby, the permanent magnet 60 inserted into the magnet insertion hole 30 can be directly cooled by the liquid medium LM which is a refrigerant.

The liquid medium LM does not necessarily need to be a refrigerant and any liquid medium can be used. The liquid medium LM may not flow through the magnet insertion hole 30 in the axial direction. For example, the magnet insertion hole 30 may be sealed by end plates (not illustrated) provided at both axial end surfaces of the rotor core 20 at both axial ends and the liquid medium LM may be accommodated in the sealed magnet insertion hole 30.

The outer diameter wall surface 33 of the magnet insertion hole 30 has an arc shape having an arc radius r33 with an arc center C33. The arc center C33 is located further on a radially outer side of the rotor core 20 than the arc center C60 and the arc radius r33 is larger than the arc radius r63 of the outer diameter surface 63 of the permanent magnet 60. Thereby, even when the permanent magnet 60 moves to the radially outer side of the rotor core 20, the circumferential central portion of the permanent magnet 60 does not abut on the magnet insertion hole 30 and an outer diameter side space portion 43 is formed between the outer diameter surface 63 of the permanent magnet 60 and the outer diameter wall surface 33 of the magnet insertion hole 30.

The outer diameter side space portion 43 includes an outer diameter side storage region 430 provided at the center portion in the circumferential direction and outer diameter side throttle regions 431 provided at both end portions in the circumferential direction. The liquid medium LM is stored in the outer diameter side storage region 430. A distance D31 between the permanent magnet 60 and the magnet insertion hole 30 in the outer diameter side throttle region 431 is shorter than a distance D30 between the permanent magnet 60 and the magnet insertion hole 30 in the outer diameter side storage region 430.

In the embodiment, the arc radius r33 of the outer diameter wall surface 33 of the magnet insertion hole 30 is larger than the arc radius r63 of the outer diameter surface 63 of the permanent magnet 60. Therefore, with a simple configuration, it is possible to surely form a shape in which the distance D31 is shorter than the distance D30, and thus the outer diameter side storage region 430 and the outer diameter side throttle region 431 can be formed.

The inner diameter wall surface 34 of the magnet insertion hole 30 has an arc shape with an arc radius r34 with an arc center C34. The arc center C34 is located further on a radially inner side of the rotor core 20 than the arc center C60 and the arc radius r34 is smaller than the arc radius r64 of the inner diameter surface 64 of the permanent magnet 60. Thereby, even when the permanent magnet 60 moves inward in the radial direction of the rotor core 20, the circumferential central portion of the permanent magnet 60 does not abut on the magnet insertion hole 30. Therefore, an inner diameter side space portion 44 is formed between the inner diameter surface 64 of the permanent magnet 60 and the inner diameter wall surface 34 of the magnet insertion hole 30.

The inner diameter side space portion 44 includes an inner diameter side storage region 440 provided in the circumferential central portion and inner diameter side throttle regions 441 provided at both circumferential end portions. The liquid medium LM is stored in the inner diameter side storage region 440. A distance D41 between the permanent magnet 60 and the magnet insertion hole 30 in the inner diameter side throttle region 441 is shorter than a distance D40 between the permanent magnet 60 and the magnet insertion hole 30 in the inner diameter side storage region 440.

In the present embodiment, the arc radius r34 of the inner diameter wall surface 34 of the magnet insertion hole 30 is smaller than the arc radius r64 of the inner diameter surface 64 of the permanent magnet 60. Therefore, with a simple configuration, a shape in which the distance D41 is shorter than the distance D40 can be surely formed and the inner diameter side storage region 440 and the inner diameter side throttle region 441 can be formed.

<When Rotation Speed of Rotor Increases>

When the rotor 10 does not rotate or rotates at a low speed, the permanent magnet 60 is attracted to the inner side in the radial direction of the rotor core 20 having a large amount of iron by the magnetic force and is held in a state where the inner diameter side first end portion 641 and the inner diameter side second end portion 642 abut on the inner diameter wall surface 34 of the magnet insertion hole 30.

Figure 3A:
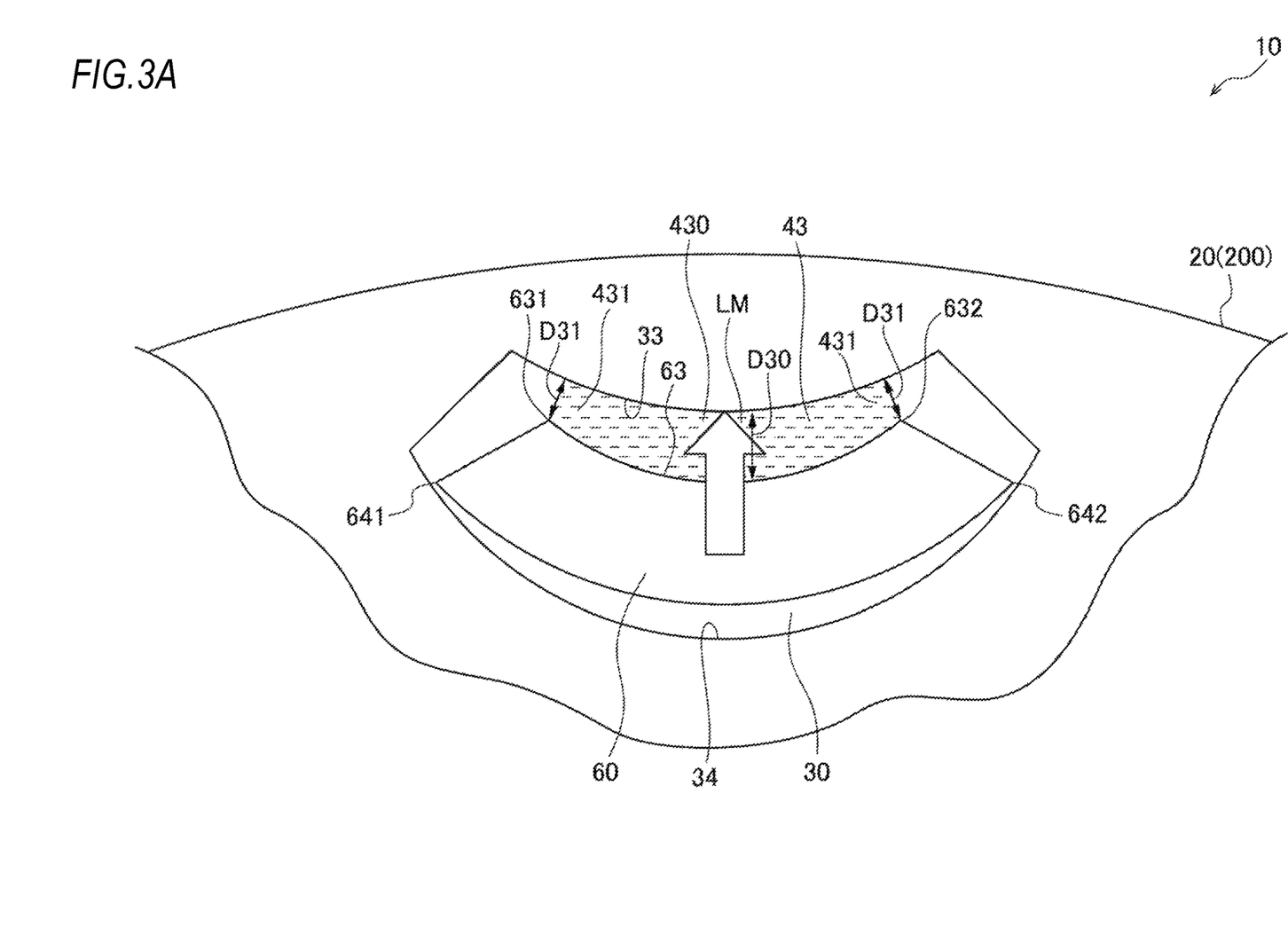
FIG. 3A is a schematic view around the magnetic pole portion illustrating movement of a permanent magnet when a rotation speed of the rotor of the rotating electrical machine in FIG. 1 is increased.

When the rotation speed of the rotor 10 increases and exceeds a predetermined rotation speed, the centrifugal force generated in the permanent magnet 60 becomes larger than the magnetic force attracted to the inner side in the radial direction of the rotor core 20. Therefore, as illustrated in FIG. 3A, the permanent magnet 60 moves outward in the radial direction and the volume of the outer diameter side space portion 43 is changed to be reduced. Here, the liquid medium LM stored in the outer diameter side storage region 430 of the outer diameter side space portion 43 functions as a damper and the movement speed of the permanent magnet 60 outward in the radial direction is attenuated. As a result, the rotation speed of the rotor 10 increases and the permanent magnet 60 moves radially outward by centrifugal force. Here, noise generated when the outer diameter side first end portion 631 and the outer diameter side second end portion 632 of the permanent magnet 60 collide with the outer diameter wall surface 33 of the magnet insertion hole 30 can be reduced.

Since the distance D31 between the permanent magnet 60 and the magnet insertion hole 30 in the outer diameter side throttle region 431 is shorter than the distance D30 between the permanent magnet 60 and the magnet insertion hole 30 in the outer diameter side storage region 430, the liquid medium LM stored in the outer diameter side storage region 430 is not easily pushed out of the outer diameter side space region 43 from the outer diameter side throttle region 431 even when the permanent magnet 60 moves outward in the radial direction. As a result, when the permanent magnet 60 moves radially outward, the pressure of the liquid medium LM stored in the outer diameter side storage region 430 of the outer diameter side space portion 43 increases, so that a larger damper effect can be obtained. Therefore, since the movement speed of the permanent magnet 60 toward the radially outer side is further attenuated, the noise generated when the outer diameter side first end portion 631 and the outer diameter side second end portion 632 of the permanent magnet 60 collide with the outer diameter wall surface 33 of the magnet insertion hole 30 can be further reduced.

When the rotation speed of the rotor 10 increases and the permanent magnet 60 moves radially outward by centrifugal force, the larger the volume change rate of the outer diameter side space portion 43, the larger the damper effect can be obtained. In the embodiment, the outer diameter wall surface 33 of the magnet insertion hole 30 and the outer diameter surface 63 of the permanent magnet 60 both have a circular arc shape which is convex radially inward. As a result, by setting the arc radius r33 of the outer diameter wall surface 33 of the magnet insertion hole 30 and the arc radius r63 of the outer diameter surface 63 of the permanent magnet 60 to predetermined values, the outer diameter side space portion 43 having a large volume change rate is easily obtained. Therefore, with a simple configuration, a larger damper effect can be obtained effectively.

<When Rotation Speed of Rotor is Reduced>

When the rotor 10 rotates at a predetermined rotation speed or more, the centrifugal force generated in the permanent magnet 60 is larger than the magnetic force attracted to the inside in the radial direction of the rotor core 20. The permanent magnet 60 is attracted outward in the radial direction of the rotor core 20 by centrifugal force and is held in a state where the outer diameter side first end portion 631 and the outer diameter side second end portion 632 abut on the outer diameter wall surface 33 of the magnet insertion hole 30.

Figure 3B:
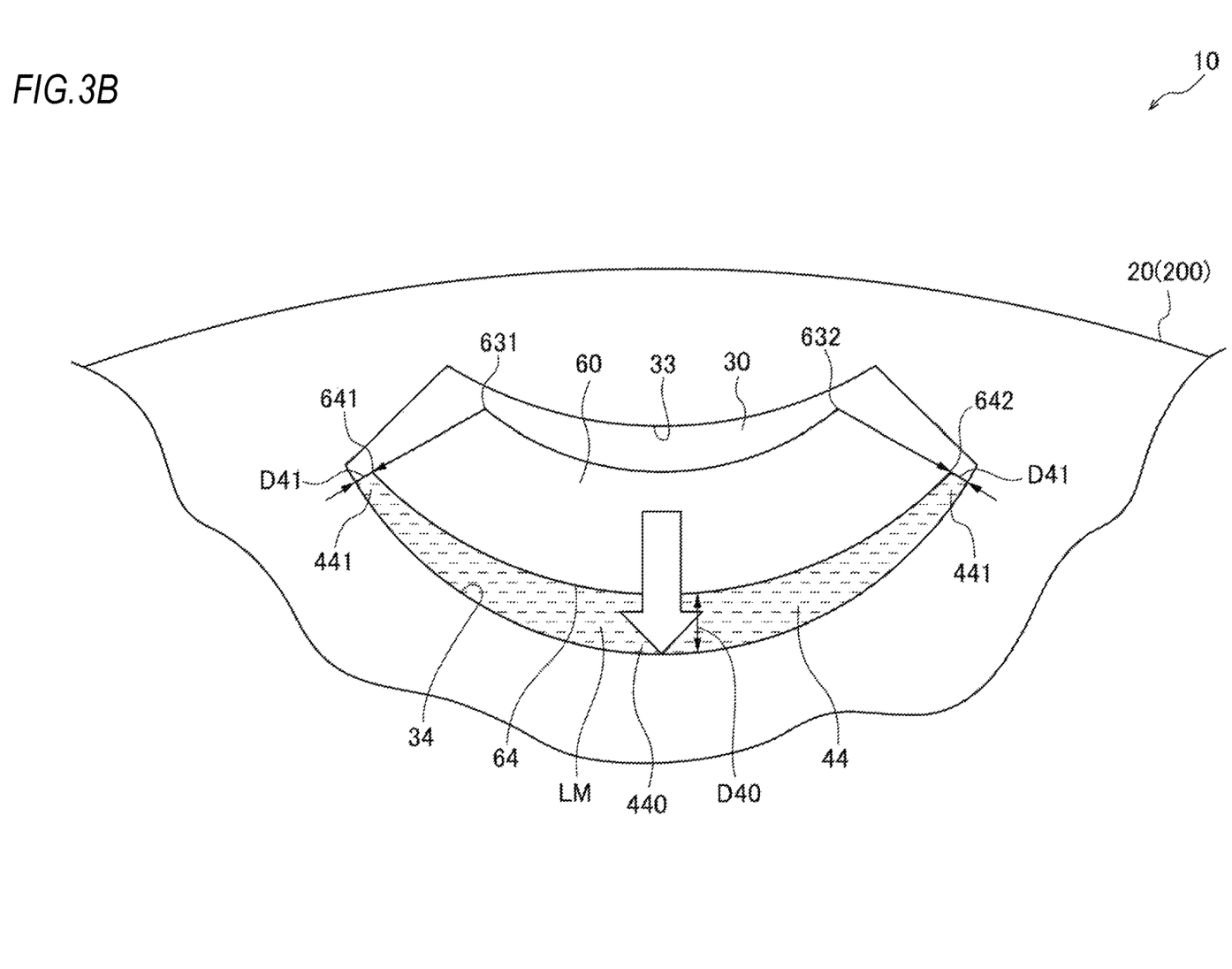
FIG. 3B is a schematic view around the magnetic pole portion illustrating the movement of the permanent magnet when the rotation speed of the rotor of the rotating electrical machine in FIG. 1 is reduced.

When the rotation speed of the rotor 10 is reduced and becomes less than a predetermined rotation speed, the centrifugal force generated in the permanent magnet 60 becomes smaller than the magnetic force directed radially inward of the rotor core 20 including a large amount of iron. Therefore, as illustrated in FIG. 3B, the permanent magnet 60 moves inward in the radial direction and the volume of the inner diameter side space portion 44 is changed to be smaller. Here, the liquid medium LM stored in the inner diameter side storage region 440 of the inner diameter side space portion 44 functions as a damper and the movement speed of the permanent magnet 60 inward in the radial direction is attenuated. As a result, the rotation speed of the rotor 10 is reduced and the permanent magnet 60 moves radially outward by the magnetic force. Here, the noise generated when the inner diameter side first end portion 641 and the inner diameter side second end portion 642 of the permanent magnet 60 collide with the inner diameter wall surface 34 of the magnet insertion hole 30 can be reduced.

Since the distance D41 between the permanent magnet 60 and the magnet insertion hole 30 in the inner diameter side throttle region 441 is shorter than the distance D40 between the permanent magnet 60 and the magnet insertion hole 30 in the inner diameter side storage region 440, the liquid medium LM stored in the inner diameter side storage region 440 is not easily pushed out of the inner diameter side space portion 44 from the inner diameter side throttle region 441 even when the permanent magnet 60 moves inward in the radial direction. Therefore, when the permanent magnet 60 moves inward in the radial direction, the pressure of the liquid medium LM stored in the inner diameter side storage region 440 of the inner diameter side space portion 44 is increased, so that a larger damper effect can be obtained. Therefore, since the movement speed of the permanent magnet 60 inward in the radial direction is further attenuated, the noise generated when the inner diameter side first end portion 641 and the inner diameter side second end portion 642 of the permanent magnet 60 collide with the inner diameter wall surface 34 of the magnet insertion hole 30 can be further reduced.

When the rotation speed of the rotor 10 is reduced and the permanent magnet 60 moves radially inward by the magnetic force, the larger the volume change rate of the inner diameter side space portion 44, the larger the damper effect can be obtained. In the embodiment, the inner diameter wall surface 34 of the magnet insertion hole 30 and the inner diameter surface 64 of the permanent magnet 60 both have a circular arc shape which is convex radially inward. As a result, by setting the arc radius r34 of the inner diameter wall surface 34 of the magnet insertion hole 30 and the arc radius r64 of the inner diameter surface 64 of the permanent magnet 60 to predetermined values, the inner diameter side space portion 44 having a large volume change rate is easily obtained. Therefore, with a simple configuration, a larger damper effect can be obtained effectively.

The invention is not limited to embodiment described above and modifications, improvements, and the likes can be made as appropriate.

For example, in the embodiment, one magnetic pole portion 50 is constituted by one permanent magnet 60. However, one magnetic pole portion 50 may be constituted by a plurality of permanent magnets. Here, each permanent magnet constituting the magnetic pole portion 50, the magnet insertion hole into which the permanent magnet is inserted, and the space portion can be configured in the same manner as in the embodiment.

At least the following matters are described in the specification. Although the constituent component or the like which correspond in the embodiment described above are described in a parenthesis, it is not limited to this.

(1) A rotor (rotor 10) of a rotating electrical machine, which includes:

a substantially annular rotor core (rotor core 20) with a plurality of magnet insertion holes (magnet insertion holes 30) formed along a circumferential direction; and a plurality of magnetic pole portions (magnetic pole portions 50) including permanent magnets (permanent magnets 60) inserted into the plurality of magnet insertion holes, in which a liquid medium (liquid medium LM) flows or is accommodated in the magnet insertion hole, the permanent magnet is inserted into the magnet insertion hole to be movable in a radial direction, a space portion (outer diameter side space portion 43, inner diameter side space portion 44) is provided between a space portion forming surface (outer diameter surface 63, inner diameter surface 64) of at least one of the outer diameter surface (outer diameter surface 63) and the inner diameter surface (inner diameter surface 64) of the permanent magnet and a wall surface (outer diameter wall surface 33, inner diameter wall surface 34) of the magnet insertion hole facing the space portion forming surface, the space portion includes:

a liquid medium storage region (outer diameter side storage region 430, inner diameter side storage region 440) which is provided in a center in the circumferential direction and stores the liquid medium; and liquid medium throttle regions (outer diameter side throttle regions 431, inner diameter side throttle regions 441) provided at both end portions in the circumferential direction, and a distance (distance D31, D41) between the permanent magnet and the magnet insertion hole in the liquid medium throttle region is shorter than a distance (distance D30, D40) between the permanent magnet and the magnet insertion hole in the liquid medium storage region.

According to (1), when the permanent magnet moves in the radial direction due to a change in the rotation speed of the rotor the volume of the space portion is changed to become smaller, the liquid medium stored in the liquid medium storage region of the space portion functions as a damper. As a result, it is possible to reduce the noise generated when the permanent magnet collides with the magnet insertion hole due to a change in the rotation speed of the rotor.

In the space portion, the distance between the permanent magnet and the magnet insertion hole in the liquid medium throttle region is shorter than the distance between the permanent magnet and the magnet insertion hole in the liquid medium storage region. As a result, a larger damper effect can be obtained by the liquid medium stored in the liquid medium storage region in the space portion.

(2) In the rotor of the rotating electrical machine according to (1), the space portion forming surface is the outer diameter surface of the permanent magnet.

According to (2), since the space portion forming surface is the outer diameter surface of the permanent magnet, the space portion is formed on the radially outer side of the permanent magnet. As a result, when the rotation speed of the rotor increases and the permanent magnet moves radially outward, the liquid medium stored in the liquid medium storage region of the space portion functions as a damper. As a result, the noise generated when the rotation speed of the rotor increases and the permanent magnet collides with the magnet insertion hole can be reduced.

(3) In the rotor of the rotating electrical machine according to (2), both the space portion forming surface of the permanent magnet and the wall surface of the magnet insertion hole facing the space portion forming surface with the space portion interposed therebetween have a circular arc shape which is convex radially inward.

According to (3), since both the space portion forming surface of the permanent magnet and the wall surface of the magnet insertion hole facing the space portion forming surface with the space portion interposed therebetween have a circular arc shape which is convex radially inward, the damper effect can be effectively obtained by the liquid medium stored in the liquid medium storage region in the space portion.

(4) In the rotor of the rotating electrical machine according to (3), an arc radius (arc radius r63) of the space portion forming surface of the permanent magnet is smaller than an arc radius (arc radius r33) of the wall surface of the magnet insertion hole facing the space portion forming surface with the space portion interposed therebetween.

According to (4), since the arc radius of the space portion forming surface of the permanent magnet is smaller than the arc radius of the wall surface of the magnet insertion hole facing the space portion forming surface with the space portion interposed therebetween, a liquid medium storage region and a liquid medium throttle region can be reliably formed with a simple configuration.

(5) In the rotor of the rotating electrical machine according to (1), the space portion forming surface is the inner diameter surface of the permanent magnet.

According to (5), since the space portion forming surface is the inner diameter surface of the permanent magnet, the space portion is formed on the radially inner side of the permanent magnet. As a result, when the rotation speed of the rotor is reduced and the permanent magnet moves radially inward, the liquid medium stored in the liquid medium storage area in the space portion functions as a damper. As a result, the noise generated when the rotation speed of the rotor is reduced and the permanent magnet collides with the magnet insertion hole can be reduced.

(6) In the rotor of the rotating electrical machine according to (5), both the space portion forming surface of the permanent magnet and the wall surface of the magnet insertion hole facing the space portion forming surface with the space portion interposed therebetween have a circular arc shape which is convex radially inward.

According to (6), since both the space portion forming surface of the permanent magnet and the wall surface of the magnet insertion hole facing the space portion forming surface with the space portion interposed therebetween have a circular arc shape which is convex radially inward, the damper effect can be effectively obtained by the liquid medium stored in the liquid medium storage region in the space portion.

(7) In the rotor of the rotating electrical machine according to (6), an arc radius (arc radius r64) of the space portion forming surface of the permanent magnet is larger than an arc radius (arc radius r34) of the wall surface of the magnet insertion hole facing the space portion forming surface with the space portion interposed therebetween.

According to (7), since the arc radius of the space portion forming surface of the permanent magnet is larger than the arc radius of the wall surface of the magnet insertion hole facing the space portion forming surface with the space portion interposed therebetween, the liquid medium storage region and the liquid medium throttle region can be reliably formed with a simple configuration.

(8) In the rotor of the rotating electrical machine according to any one of (1) to (7), the liquid medium is a refrigerant which cools the rotor.

According to (8), since the liquid medium flowing through the magnet insertion hole is a refrigerant which cools the rotor, the permanent magnet inserted into the magnet insertion hole can be directly cooled by the liquid medium.

The invention claimed is:

1. A rotor of a rotating electrical machine comprising:
   a substantially annular rotor core with a plurality of magnet insertion holes formed along a circumferential direction; and
   a plurality of magnetic pole portions including permanent magnets inserted into the plurality of magnet insertion holes, wherein
   a liquid medium flows or is accommodated in the magnet insertion hole,
   the permanent magnet is inserted into the magnet insertion hole to be movable in a radial direction,
   the liquid medium enables a damper effect to be obtained that attenuates a movement speed of the permanent magnet in the radial direction,
   a space portion is provided between a space portion forming surface of at least one of the outer diameter surface and the inner diameter surface of the permanent magnet and a wall surface of the magnet insertion hole facing the space portion forming surface,
   the space portion includes:
      a liquid medium storage region which is provided in a center in the circumferential direction and stores the liquid medium, and
      liquid medium throttle regions provided at both end portions in the circumferential direction,
   a distance between the permanent magnet and the magnet insertion hole in the liquid medium throttle region is shorter than a distance between the permanent magnet and the magnet insertion hole in the liquid medium storage region, and
   when the permanent magnet moves radially toward the space portion, a pressure of the liquid medium stored in the liquid medium storage region increases so that a larger damper effect is obtained.

2. The rotor of the rotating electrical machine according to claim 1, wherein
   the space portion forming surface is the outer diameter surface of the permanent magnet.

3. The rotor of the rotating electrical machine according to claim 2, wherein
   both the space portion forming surface of the permanent magnet and the wall surface of the magnet insertion hole facing the space portion forming surface with the space portion interposed therebetween have a circular arc shape which is convex radially inward.

4. The rotor of the rotating electrical machine according to claim 3, wherein
   an arc radius of the space portion forming surface of the permanent magnet is smaller than an arc radius of the wall surface of the magnet insertion hole facing the space portion forming surface with the space portion interposed therebetween.

5. The rotor of the rotating electrical machine according to claim 1, wherein
   the space portion forming surface is the inner diameter surface of the permanent magnet.

6. The rotor of the rotating electrical machine according to claim 5, wherein
   both the space portion forming surface of the permanent magnet and the wall surface of the magnet insertion hole facing the space portion forming surface with the space portion interposed therebetween have a circular arc shape which is convex radially inward.

7. The rotor of the rotating electrical machine according to claim 6, wherein
   an arc radius of the space portion forming surface of the permanent magnet is larger than an arc radius of the wall surface of the magnet insertion hole facing the space portion forming surface with the space portion interposed therebetween.

8. The rotor of the rotating electrical machine according to claim 1, wherein
   the liquid medium is a refrigerant which cools the rotor.

* * * * *